Figure 1:
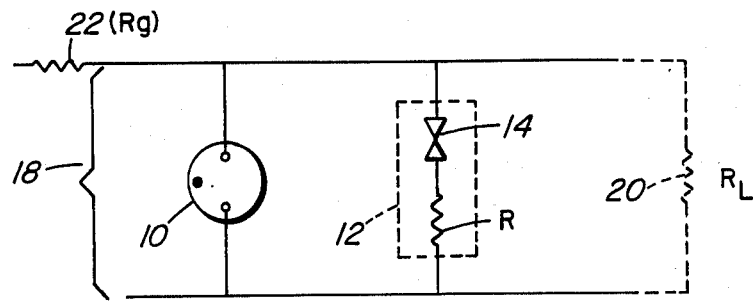

United States Patent [19]

Borkowicz et al.

[11] Patent Number: 4,625,255
[45] Date of Patent: Nov. 25, 1986

[54] INTERACTIVE OVERVOLTAGE PROTECTION DEVICE

[75] Inventors: Jerzy Borkowicz, Ottawa; James E. Anderson, Almonte; Frederick C. Livermore, Stittsville, all of Canada

[73] Assignee: Northern Telecom Limited, Montreal, Canada

[21] Appl. No.: 602,895

[22] Filed: Apr. 23, 1984

[51] Int. Cl.⁴ .............................................. H02H 9/04
[52] U.S. Cl. ........................................ 361/91; 361/56; 361/111; 361/119; 361/120
[58] Field of Search ................... 361/56, 91, 111, 119, 361/118, 120

[56] References Cited

U.S. PATENT DOCUMENTS 3,934,175  1/1976  Clark ..................................... 361/56
4,023,071  5/1977  Fussell ............................. 361/111 X
4,544,983  10/1985  Anderson et al. .................. 361/124

FOREIGN PATENT DOCUMENTS 581917  11/1976  Switzerland ........................... 361/56

Primary Examiner—A. D. Pellinen
Assistant Examiner—Jeffrey A. Gaffin
Attorney, Agent, or Firm—Thomas Adams

[57]  ABSTRACT

An overvoltage protection device, especially for telephone equipment and the like, comprises two protectors connected directly in parallel. One protector, for example a back-to-back semiconductor diode, has a breakdown voltage below which it is a high impedance. Between the breakdown voltage and a failure voltage it has a lower impedance. Above the failure voltage it has negligible impedance. The other protector, for example a gas tube, has a range of operating voltages which extends from below the breakdown voltage of the diode, to a voltage between the breakdown voltage and the failure voltage of the diode. In operation the two protectors interact, the diode operating, for example, on faster surges and, in so doing, slowing the surge front so as to increase the likelihood that the gas tube will fire.

3 Claims, 13 Drawing Figures

INTERACTIVE OVERVOLTAGE PROTECTION DEVICE

This invention relates to overvoltage protection devices and is especially concerned with devices for protecting communications equipment, for example telephone equipment, against hazardous voltage surges caused by lightning, induced power surges, or other transient events.

Typically, such overvoltage protection devices comprise a primary protector in the form of a gas tube, carbon block, varistor, or other device which will operate repeatedly to shunt excessive surge energy away from the equipment. Generally, and especially in the case of gas tubes, it is not sufficient to rely upon such a primary protector alone to protect the system since its breakdown voltage may increase with age and, in any event, the breakdown voltage of an individual protector will be subject to statistical variation about a mean value, referred to in this specification as its "normal operating voltage".

In particular, the breakdown voltage will usually be higher the faster the risetime of the applied surge. Also, the protector may deteriorate over a period of time and, at least in the case of a gas tube, its "normal" operating voltage may increase.

It is known to provide an additional protector in parallel with the primary protector. The additional protector is arranged to operate if the primary protector fails to operate or deteriorates to a predetermined extent so that it does not operate quickly enough. Typically such additional devices comprise a pair of air-spaced electrodes. A problem with such devices is that they are susceptible to corrosion, creepage and contamination which may lead to an increase in the statistical variation in failure voltage.

In another type of protection device, the additional protector is parallel with the primary protector and is arranged to fail safe (short-circuit) after a few operations, perhaps only one.

In another type of protection device, the additional protector operates with the primary protector, although the two are segregated operationally. Such an overvoltage protection device is disclosed in U.S. Pat. No. 3,934,175, by Oscar M. Clarke, dated Jan. 20, 1976, which is incorporated herein by reference. Clarke discloses a primary protector in the form of a gas tube and a secondary or additional protector in the form of a semiconductor device, particularly a diode. The two protectors are connected together by means of a delay line in the form of an inductor and resistor connected in series. According to Clarke's disclosure, the gas tube dissipates most of the energy of an incoming surge. Since the gas tube takes a finite time to fire, however, some energy bypasses it. The majority of this bypass energy is shunted by the semiconductor device. The delay line effectively segregates the two protectors so that they operate independently. More specifically, the delay line is intended to ensure that the semiconductor device does not clamp the surge voltage below a voltage necessary to fire the gas tube spark gap. Such a two-stage protector is not entirely satisfactory since the parameters of the delay line and diode are matched to suit a particular operating voltage for the gas tube. If the tube degrades, the operating voltage range will tend to increase, applying more energy to the delay line and semiconductor device than previously. This is thought to produce untimely failure.

A further disadvantage of Clarke's device is that a series impedance is needed, which increases expense. In telephony applications, it would be possible to use, as the impedance, the heat coil of a thermal fuse. However, this would have limited application since only a selection of central offices are equipped with heat coils, and they tend to be of too low an impedance value. Moreover, the impedance necessitates more space and decreases bandwidth.

The present invention seeks to overcome one or more of these problems.

An aspect of the present invention provides an interactive overvoltage protection device for protecting a telecommunications transmission line against a voltage surge. The protection device comprises a primary protector and a secondary protector for connection directly in parallel across the transmission line. The primary protector, for example a gas tube, has firing voltages which increase with the rate of change of applied voltages to which it is subjected. The secondary protector comprises a semiconductor device, for example a pair of back-to-back diodes having:

a high impedance when subjected to applied voltages below a predetermined operating voltage;

a substantially negligible impedance when subjected to applied voltages above a predetermined failure voltage, the failure voltage exceeding the operating voltage; and a dynamic impedance when subjected to applied voltages between the operating voltage and the failure voltage.

When the protection device is subjected to a voltage surge, the dynamic impedance will reduce the rate of change of that part of the voltage surge in the range between the operating and failure voltage, thereby increasing the probability of the primary protector firing at an applied voltage in this range.

In normal operation, the firing voltage of the primary protector is less than the operating voltage of the secondary protector. Hence, if the voltage surge exceeds the firing voltage, the primary protector will fire to dissipate the voltage surge. As the primary protector will clamp the voltage below the operating voltage of the secondary protector, the secondary protector will not operate during normal operation of the protection device.

If the firing voltage of the primary protector should exceed the operating voltage of the secondary protector however, the secondary protector will operate to modify the waveform of the voltage surge so as to lower the firing voltage of the primary protector. In many cases, this will enable the primary protector to fire, clamping the voltage at a safe level.

If the modified firing voltage of the primary protector exceeds the failure voltage of the secondary protector, the secondary protector will fail short circuit to protect the transmission line.

A method of selecting two protectors for use in a device according to the invention comprises the step of calculating for the device an energy factor WfR which in the case of a linear ramp surge is in accordance with the equation such as $$W\!f\!R = \frac{(V_{od} - V_{og})^2}{3a} \cdot \left( V_{od} + \frac{V_{og}}{2} \right) + \frac{1}{b} \cdot$$

$$\left[ V_{fl}\!\left( \frac{V_f}{3} - \frac{V_{og}}{2} \right) - V_{od2} \cdot \left( \frac{V_{od}}{3} - \frac{V_{og}}{2} \right) \right]$$

where
  $V_f$ is the operating voltage of the gas tube-diode system
  $V_{od}$ is the "normal operating voltage" or breakdown voltage of the diode
  $V_{og}$ is the "normal operating voltage" of the gas tube for a slow voltage ramp
  a is the ramp speed of the applied voltage surge
  b is the effective speed of the ramp when the diode is conducting, i.e. when $V_{od}$ has been exceeded.

Figure 2:
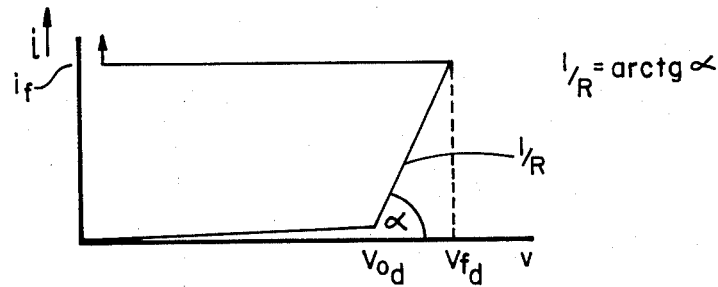
Figure 3:
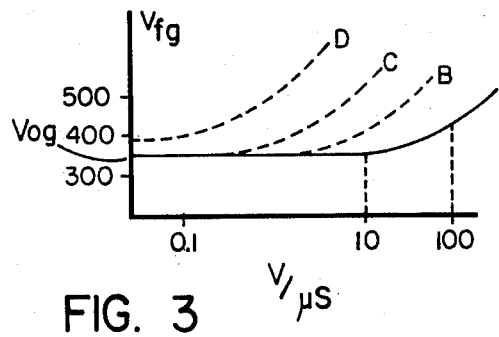
Figure 4:
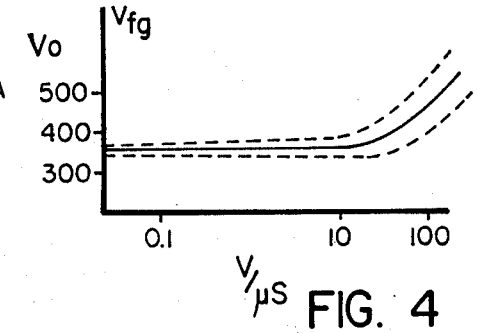
Figure 5:
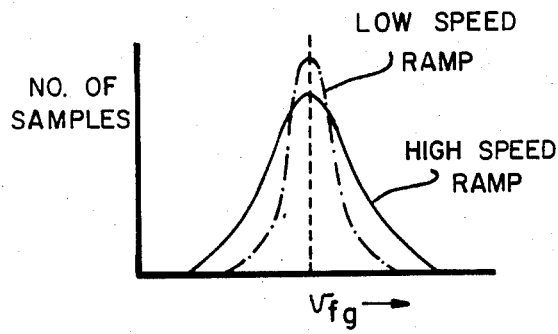
Figure 6:
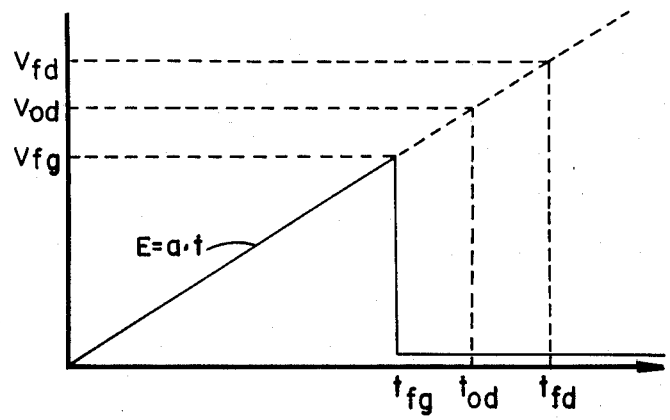
Figure 7:
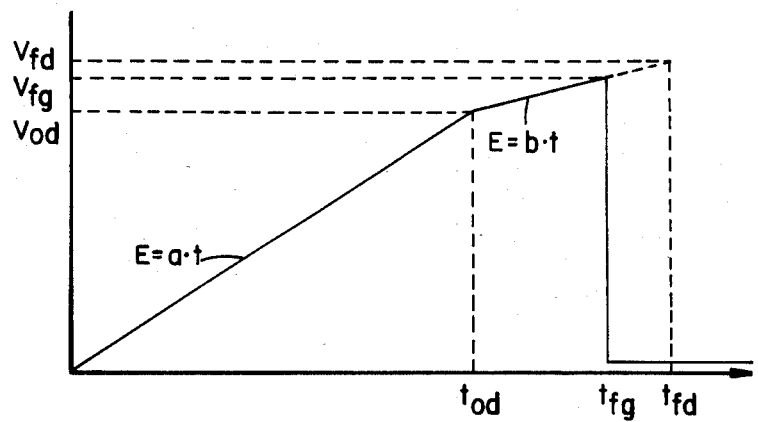
Figure 8:
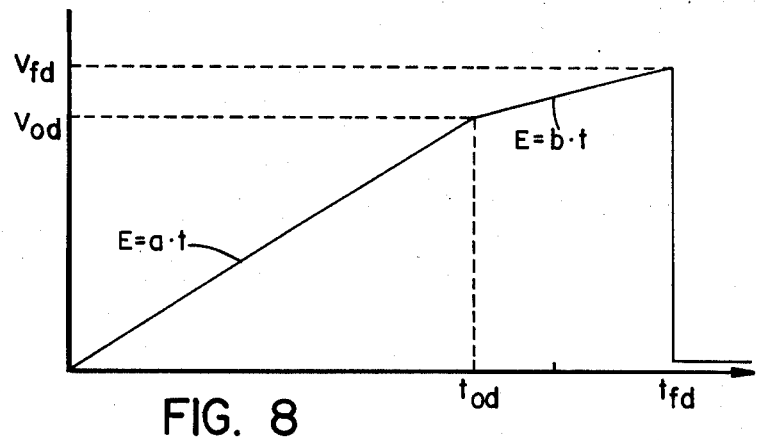
Figure 9:
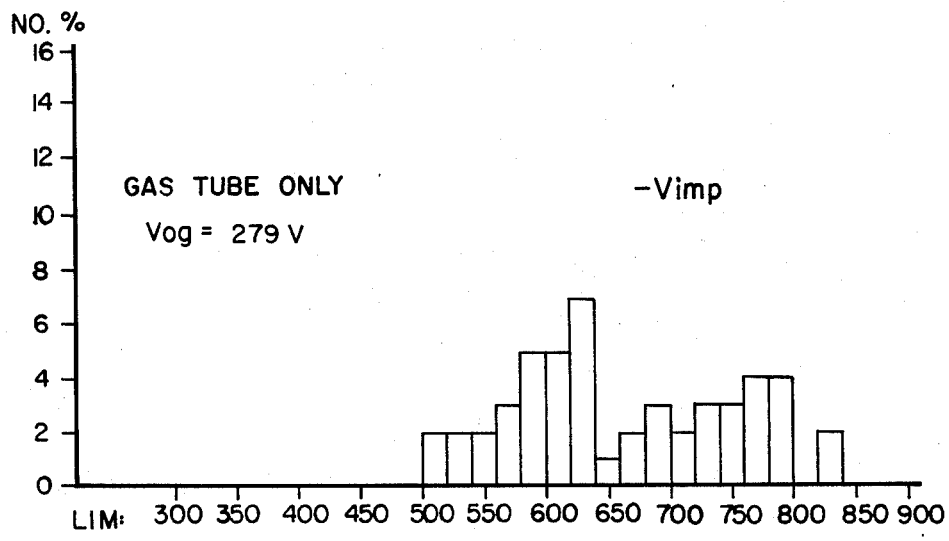
Figure 10:
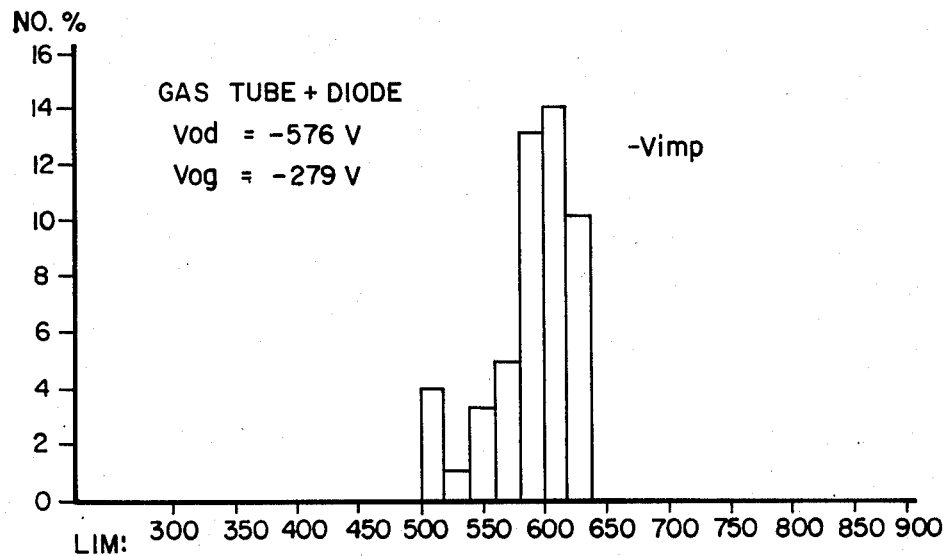
Figure 11:
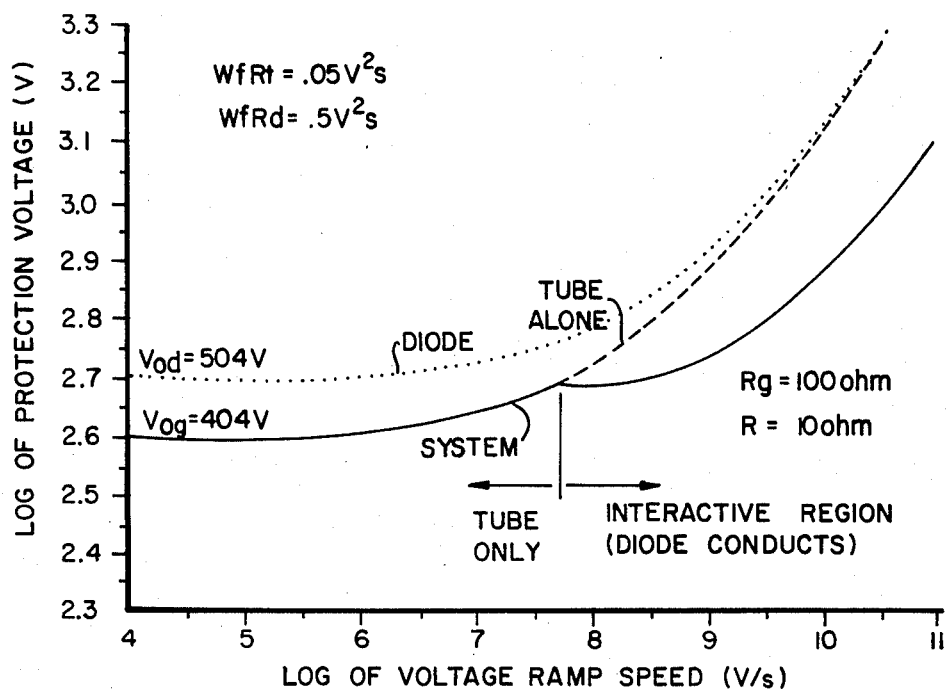
Figure 12:
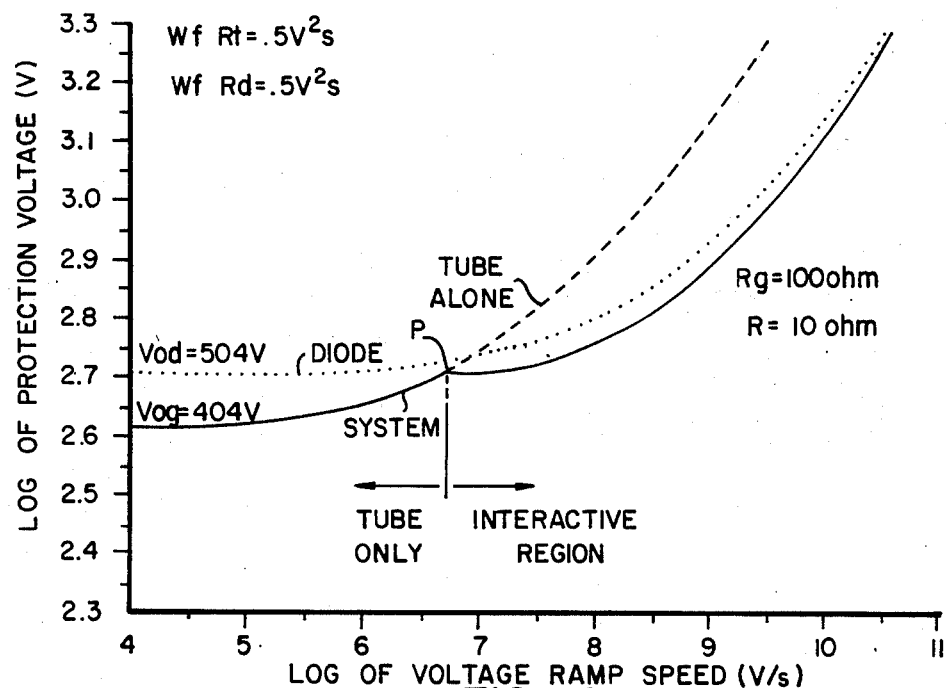
Figure 13:
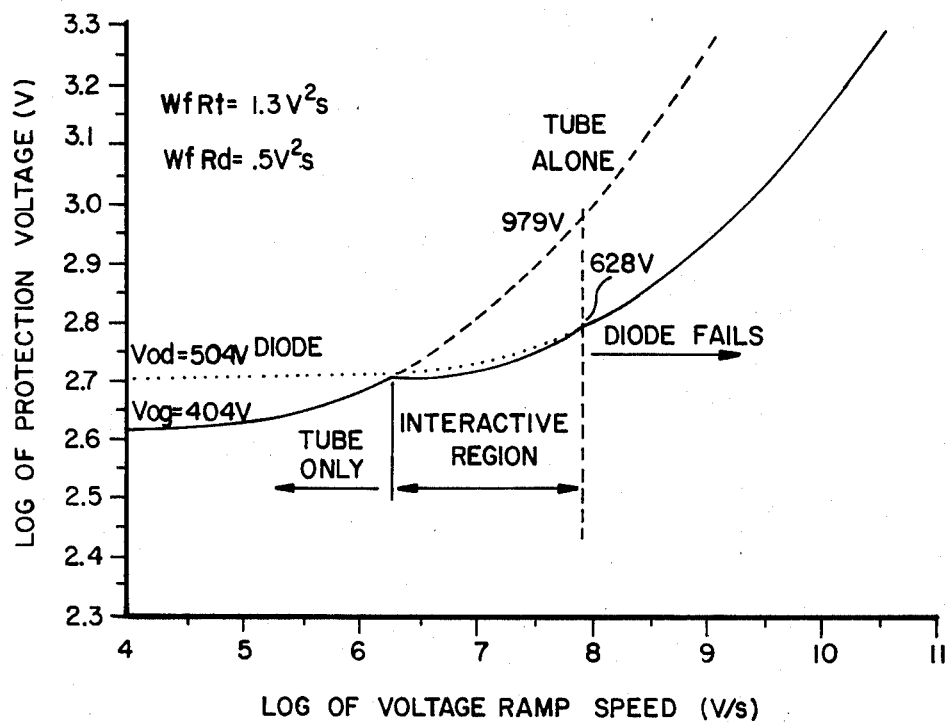

An embodiment of the invention will now be described, by way of example only, with reference to the accompanying drawings, in which:

FIG. 1 is a schematic representation of an embodiment of the invention comprising two interactive protectors connected across a load, FIG. 2 illustrates the current/voltage characteristic of one protector, FIG. 3 illustrates the breakdown voltage/rate of change of voltage characteristic of the other protector, FIGS. 4 and 5 illustrate statistical variation of the breakdown voltage of such other protector, FIGS. 6, 7 and 8 illustrate interactive operation of the two protectors for a particular ramp speed, FIGS. 9 and 10 illustrate the performance of the gas tube alone, and with the diode, and FIGS. 11, 12 and 13 illustrate interactive operation for different ramp speeds.

In FIG. 1, an overvoltage protection device is shown comprising a primary protector in the form of a gas tube 10, and a secondary protector in the form of a semiconductor device 12, specifically a "back-to-back" pair of diodes 14. The dynamic impedance of the diodes is of significance and so has been shown separately as a series resistor R. The semiconductor device 12 and gas tube 10 are connected directly in parallel with each other and across a transmission line 18. The impedance $R_L$ of the equipment being protected is shown as a resistor 20 connected across the semiconductor device. The source impedance is indicated by resistor 22 in series with the line 18.

The operating characteristic of the diode device 12, shown in FIG. 2, shows that when the voltage applied across it is less than its "normal operating voltage", $V_{od}$, the diode exhibits a high impedance and negligible current flows through it. Once $V_{od}$ is exceeded, the diode 14 will start to conduct. The current through it will be determined by its dynamic impedance R. At a level of applied voltage $V_{fd}$ and corresponding current $i_{fd}$, the diode will fail substantially short-circuit. It will be appreciated that $V_{od}$ and $V_{fd}$ will vary statistically and in dependence upon the rate of change of the voltage surge on the transmission line.

The operating characteristics of the first protector, gas-filled spark gap 10, are illustrated in FIGS. 3, 4 and 5. In FIG. 3, curve A represents the variation of breakdown or firing voltage for the spark gap, with respect to the rate of change of the applied voltage surge. Curves B, C and D represent the effects of progressive degradation of the gas-filled spark gap, typically as a result of contamination of the atmosphere, electrodes or insulators of the tube or changes in pressure of the gas filling the gap. The breakdown voltage $V_{og}$ of the gas-filled spark gap will also be subject to statistical variations as illustrated in FIGS. 4 and 5, the statistical spread increasing with the rate of change of the applied voltage. A further characteristic of the typical gas tube is that increasing the time for which a particular voltage is applied to it will increase the probability that the spark gap will fire.

The characteristics of the gas tube 10 and diode 12 are carefully correlated so that they will interact. In particular, the normal operating voltage $V_{od}$ for the diode is arranged to be well within the range of breakdown voltages for the gas tube, although above the low speed breakdown voltage $V_{og}$ of the gas tube spark gap. The specific way in which the respective characteristics are interrelated and determined will be explained more fully hereafter.

Interactive operation of the two protectors is illustrated in FIGS. 6, 7 and 8. For simplicity of explanation, it is assumed that the same linear ramp voltage, E=a·t, is applied in each case. FIG. 6 illustrates a case where the gas tube 10 breaks down or fires when the applied voltage has reached a value $V_{og}$ after $t_{og}$ seconds. Since the gas tube operated before the normal operating voltage $V_{od}$ of the diode 12 was reached, the diode did not conduct.

FIG. 7 illustrates the case where the gas tube did not operate before the ramp voltage reached the normal operating voltage $V_{od}$ of the diode. Consequently the diode started to conduct. The dynamic impedance R of the diode is thus connected in series with the source. Since the source is of finite impedance (typically the impedance of the transmission line 18), the ramp voltage will increase at a slower rate, E=b·t. Apart from the increase in the applied voltage, the slowing of its rate of change will increase the probability that the gas tube will operate. Such operation is indicated after time $t_{og}$ in FIG. 7, which is before the energy-handling capability of the diode has been exceeded.

FIG. 8 illustrates the case where the gas tube does not operate at all. Consequently, after $V_{od}$ is exceeded the diode starts to conduct. At $V_{fd}/t_{fd}$ the energy-handling capability of the diode is exceeded and the diode fails, presenting substantially zero impedance across the line 18.

In practice, the operation of the two protectors would be so coordinated that the operation would be as per FIGS. 6 and 7 and the statistical breakdown characteristic for the pair would be as illustrated in FIG. 10. Comparing this with FIG. 9, it will be seen that the diode reduces the spread of breakdown voltages for the gas tube. One reason for this is the slowing of the applied surge front.

The way in which the combination performs for different ramp speeds is illustrated in FIGS. 11, 12 and 13. These curves show initial, intermediate and final stages, respectively, for a gas tube which initially is within design limits and then deteriorates. The particular values used in FIGS. 11, 12 and 13 correspond to parameters specified in an example which is given hereafter.

To a certain extent, degradation of the gas tube will be accommodated by increased operation of the diode. Eventually, however, degradation of the gas tube will result in failure of the diode as in the case illustrated in FIG. 8.

It should be appreciated that such ultimate diode failure is desirable and is arranged to occur at some safety margin before the first protector or gas tube has deteriorated to such an extent that the equipment being protected is endangered.

Coordination of the characteristics of the two protectors to obtain the combined or interactive performance described with reference to FIGS. 6, 7 and 8 may be achieved by calculating an "energy factor" WfR of the gas tube in a two protector system, which, in the case of a linear ramp surge, is in accordance with equation 1.

The first part of the right-hand side of the equation represents the energy factor WfR of a tube from its low speed operating voltage $V_{og}$ to the breakdown voltage $V_{od}$ of a diode (speed not affected). The second part of the sum accounts for the WfR of the tube above $V_{od}$ (speed b).

The WfR of the diode itself is given by equation:

$$WfR_d = \frac{(V_{fd} - V_{od})^2}{3b} \cdot \left( V_{fd} + \frac{V_{od}}{2} \right) \qquad 2$$

or $$WfR_d = \frac{\Delta V_{fd}2}{b} \cdot \left( \frac{\Delta V_{fd}}{3} + \frac{V_{od}}{2} \right)$$

where $V_{fd}$ is the failure voltage of the diode
$V_{od}$ is the normal operating voltage or breakdown voltage of the diode.
$\Delta V_{fd} = V_{fd} - V_{od}$
b is the ramp speed when the diode is conducting.
The WfR of the gas tube itself is given by $$WfR_g = \frac{(V_{fg} - V_{og})^2}{3a} \cdot \left( V_{fg} + \frac{V_{og}}{2} \right) \qquad 3$$

$V_{fg}$ is the breakdown voltage of the gas tube for a particular ramp speed
$V_{og}$ is the breakdown voltage for minimum ramp speed.

Specific determination of the characteristics to achieve the required coordination will be further illustrated by the following example:

A single gas tube (ELCG 8310) breakdown voltage was measured for four speeds of linear voltage ramp (20 measurement average). The three $V_{fg}$ values obtained for high ramp speeds were used to calculate average tube WfR and extrapolated $V_{og}$ (least squares fit) using equation 3. The results were:

| Ramp speed a [V/μS] | 2.10⁻³ | 29.8 | 47.1 | 100 |
|---|---|---|---|---|
| $V_{f\,meas}$ [V] | 300 | 484 | 506 | 545 |
| $V_{f\,calc}$ [V] | 404 | 485 | 504 | 546 |
| $V_{og} = 404$ V | | | | |
| $WfR_g = 0.05$ V²S | | | | |

The gas tube was combined with a diode having $V_{od}=504$ volts, WfR=0.5 V²s, and R=10 ohms. The combination was connected to a ramp generator having a=100 V/μS and Rg=100 ohms.

Using equation 1, the response of the system was calculated, producing $V_f=509$ volts.

Given by equation 2 that the diode would fail short-circuit at 628 volts, equation 1 was used again to produce WfR$_g$=1.3 V²S corresponding to this voltage. Thus, if the tube should deteriorate to such an extent that its WfR exceeded 1.3 V²S, the diode would fail and the combination device would "fail safe". It should be noted that, were the diode omitted, the gas tube breakdown voltage corresponding to WfR=1.3 V²S would be 979 volts, as given by solution to equation 3. In this case this would be considered to be a potentially damaging level.

It should be noted that although the specific description has referred only to linear ramps, the coordination of a gas tube and diode, upon which this invention is predicated can also be carried out for non-linear surges, for example exponential surge fronts. Of course, the various equations might need to be modified to take account of the new, non-linear, surge.

What is claimed is:

1. An overvoltage protection device comprising a primary protector and a secondary protector for connection directly in parallel across a transmission line,
   said primary protector, when subjected to applied voltages, having firing voltages which increase with the rate of change of said applied voltages and
   said secondary protector comprising a semiconductor device having:
   a high impedance when subjected to applied voltages below a predetermined operating voltage;
   a substantially negligible impedance when subjected to applied voltages above a predetermined failure voltage that exceeds said operating voltage; and
   a dynamic impedance when subjected to applied voltages in a range between said operating voltage and said failure voltage,
   whereby, when said protection device is subjected to a voltage surge, said dynamic impedance will reduce the rate of change of voltage of that part of said voltage surge in said range, thereby increasing the probability of said primary protector firing at an applied voltage in said range.

2. An overvoltage protection device as claimed in claim 1, wherein said primary protector comprises a gas tube.

3. An overvoltage protection device as claimed in claim 1, wherein said semiconductor device comprises a pair of diodes back-to-back.

* * * * *